April 3, 1956 J. P. BUTTERFIELD 2,740,502
AIR COOLED WHEEL BRAKE
Filed May 10, 1951 2 Sheets-Sheet 1
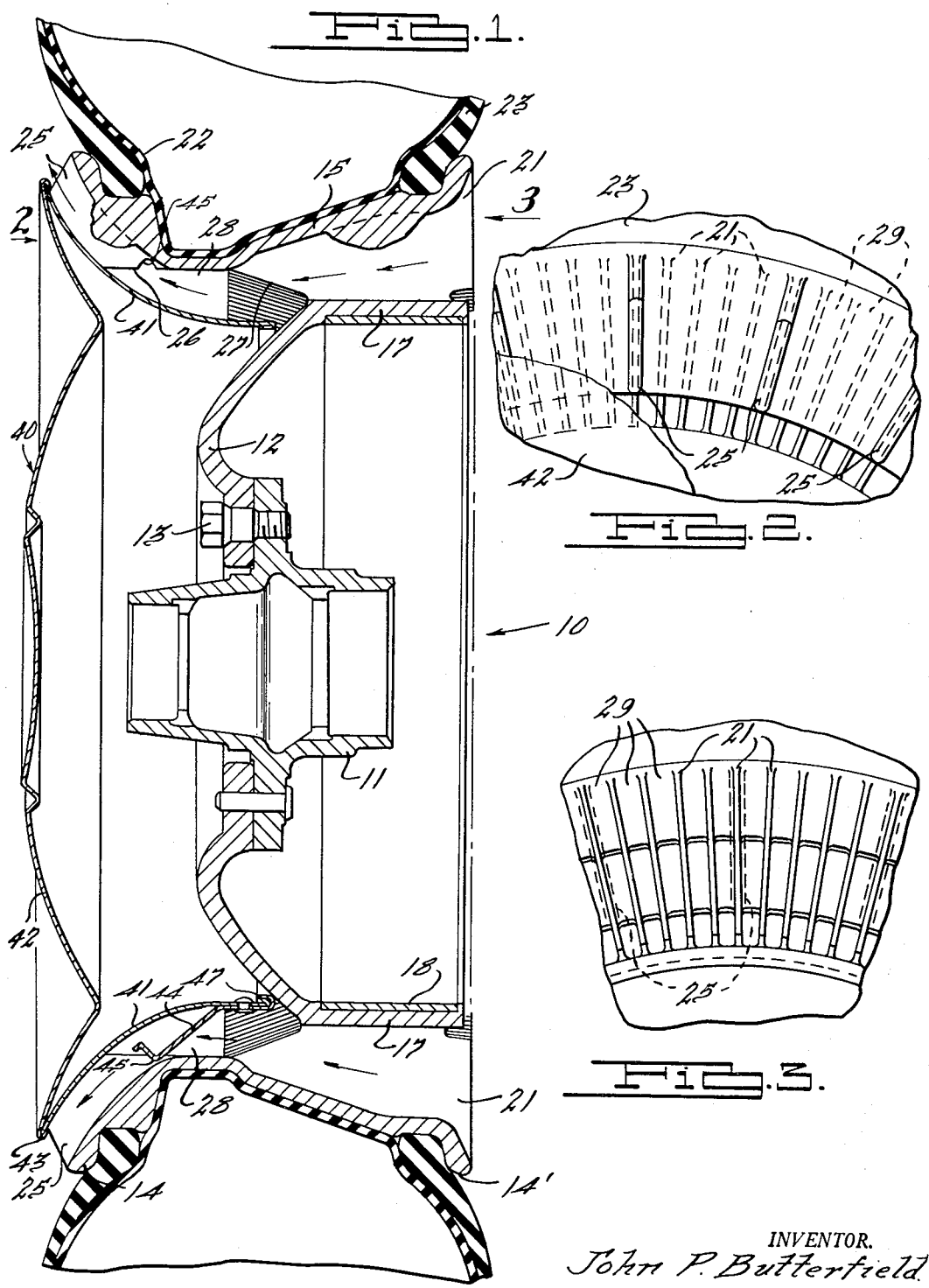
INVENTOR.
John P. Butterfield
BY
Harness and Harris
ATTORNEYS

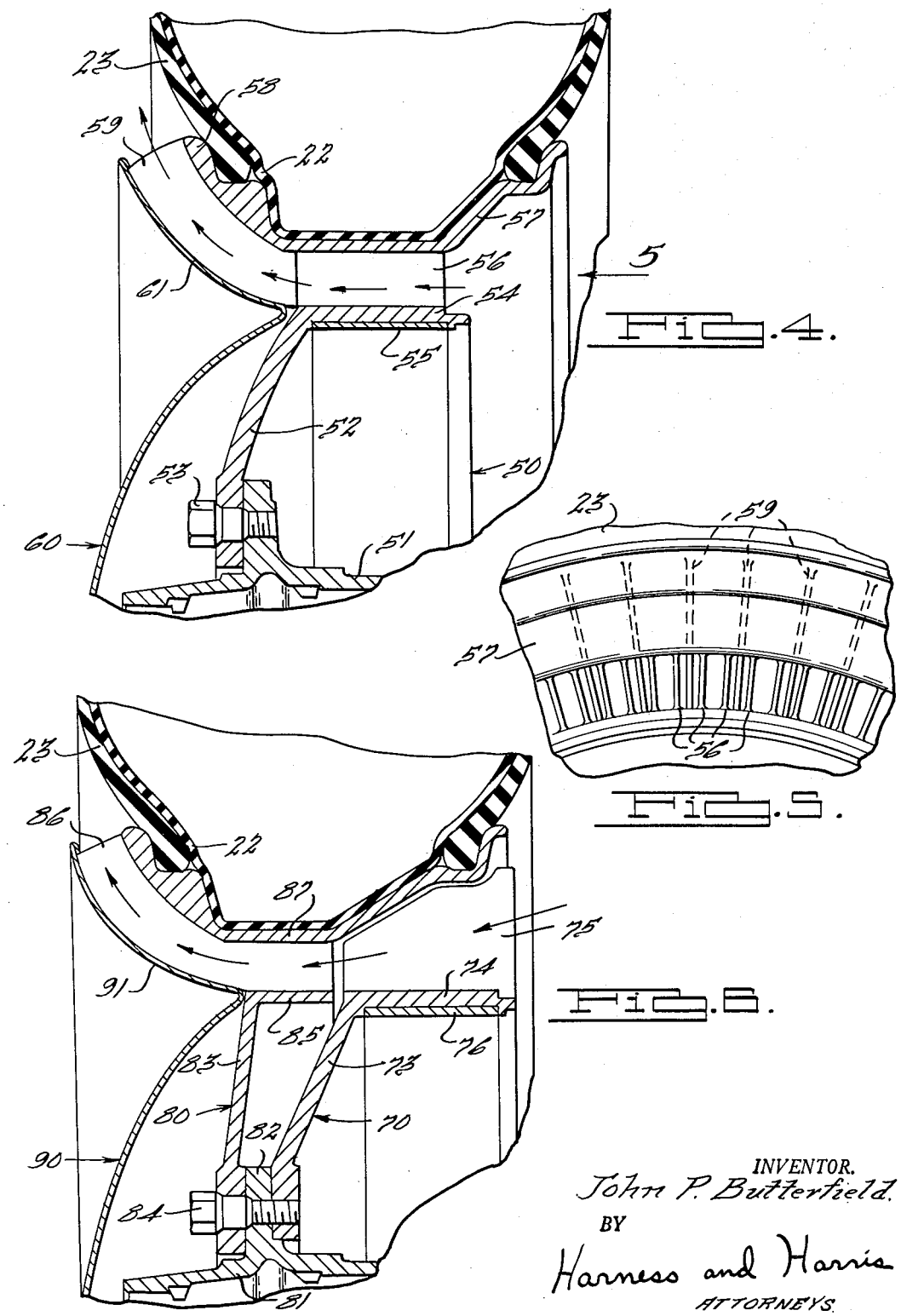

United States Patent Office 2,740,502
Patented Apr. 3, 1956

2,740,502

AIR COOLED WHEEL BRAKE

John P. Butterfield, Grosse Pointe Park, Mich., assignor to Chrysler Corporation, Highland Park, Mich., a corporation of Delaware Application May 10, 1951, Serial No. 225,649

6 Claims. (Cl. 188—264)

This invention relates to a composite wheel disc and brake drum wherein portions of the rim supporting wheel web are formed as air circulating fan vanes that are adapted to pass drum cooling air across the associated brake drum during wheel rotation.

It is a primary object of this invention to provide a composite wheel and brake drum wherein the wheel web includes an integrally formed brake drum and the wheel rim mounts integrally formed air circulating fan vanes.

It is another object of this invention to provide a wheel unit having spaced brake drum heat dissipating fins that provide the connection between the wheel web portion and the wheel rim portion.

It is another object of this invention to provide a composite wheel and brage drum having integral brake drum cooling means arranged in such a manner that the wheel is materially lighter in weight and obviously less costly than a wheel unit mounting separate brake drum and drum cooling units.

It is another object of this invention to provide a composite wheel and brake drum having integral rim mounted air circulating fan vanes wherein the exteriorly exposed, detachable, wheel cover includes portions that serve as a shroud for the fan vanes.

It is still another object of this invention to provide a novel type of wheel cover that includes portions adapted to serve as a shroud or air conduit means for passage of air through the associated wheel web portion.

It is still another object of this invention to provide a composite wheel and brake drum that includes integrally formed wheel rim mounted fan means arranged to circulate air across the brake drum that is formed as an integral part of the wheel web portion.

Other objects and advantages of this invention will become readily apparent from a reading of the following description and a consideration of the related drawings wherein:

Fig. 1 is a sectional elevational view of a wheel unit embodying one form of this invention;

Fig. 2 is a fragmentary side elevational view of a portion of the outer side of the wheel unit shown in Fig. 1, the view being taken in the direction of the arrow 2 of Fig. 1;

Fig. 3 is a fragmentary side elevational view of a portion of the inner side of the wheel unit shown in Fig. 1, the view being taken in the direction of the arrow 3 of Fig. 1;

Fig. 4 is a sectional elevational view of a portion of a wheel unit embodying a modified form of this invention;

Fig. 5 is a fragmentary side elevational view of a portion of the inner side of the wheel unit shown in Fig. 4, the view being taken in the direction of the arrow 5 of Fig. 4; and Fig. 6 is a sectional elevational view of a portion of a wheel unit embodying still another modified form of this invention.

It is thought to be unnecessary to specifically point out why air cooling of the brake drums of a friction type brake improves brake capacity, eliminates brake fading, reduces brake lining wear, reduces the required brake diameter, reduces the required clearances between the brake parts, and provides a more reliable and more effective brake under all conditions of operation. While various attempts have been made to provide effective means for cooling the brake drums of friction type brakes, it is thought that the construction herein disclosed is the first to successfully provide adequate brake drum cooling means with a minimum amount of expanse and a minimum amount of wheel weight. At the same time, this invention provides means for improving the appearance of the wheel assembly. As a result of the general desire to improve the visual appearance of the current motor vehicle, it has become quite prevalent to provide motor vehicle wheels with decorative wheel covers. These covers tend to substantially close off the circulation of heat dissipating air through the wheels and across the associated wheel braking mechanisms. At the same time vehicle speeds have increased without an equivalent increase in the size of the associated brake drum, consequently, more heat is being generated in the brake drum during braking action while less efficient forms of heat dissipating devices have been provided for cooling the drums. This invention provides an improved brake cooling device including several air circulating units and a highly decorative wheel cover, arranged such that the units cooperate to circulate the maximum amount of cooling air across the associated wheel brake drums. The construction herein disclosed represents an improvement on the devices covered by my copending applications Serial No. 103,780, filed July 9, 1949, U. S. Patent No. 2,633,944, dated April 7, 1953, and Serial No. 130,213, filed November 30, 1949, U. S. Patent No. 2,687,192, dated August 24, 1954.

Fig. 1 of the drawings discloses a wheel unit 10 adapted for use on a motor vehicle or the like. Wheel unit 10 is composed of a hub element 11 that is preferably detachably connected to a wheel web portion 12 by the bolt connectors 13. The wheel web portion 12 is substantially radially directed although it has an axially inward tilt to increase the wheel web resistance to axially directed impact loads that might be applied to the wheel web portion as a result of the outer side edge 14 of the wheel rim portion 15 striking against a curbing or a similar obstruction. Wheel web portion 12 has an integrally formed, axially extending, inwardly directed, annular flange 17 that constitutes the wheel brake drum. Brake drum flange 17 is preferably lined on its interior side with a wear resistant liner of cast iron or the like. All portions of this wheel unit, other than the brake drum liner 18, are preferably formed of some lightweight, relatively strong, material, such as aluminum or alloys thereof, which material is readily adapted for casting and molding processes.

The wheel web portion 12 has formed about its periphery a plurality of radially directed, circumferentially spaced apart fins 21. Fins 21 are integral with and project radially outwardly from the outer side of the brake drum flange 17. The outer ends of the fins 21 are integral with and support the axially extending wheel rim portion 15. Wheel rim portion 15 is adapted to have mounted thereon an inflatable tube 22 and/or a tire casing 23.

The drum supported fins 21 provide brake drum heat dissipating surfaces that are arranged to be washed with cooling air that is caused to pass from the inner side of the wheel unit to its outer side through the spaces 29 between the several fins 21. In addition to serving as brake drum heat dissipating surfaces and providing the supports for the wheel rim portion 15, the web fins 21 also produce a slight fan effect to assist in moving the air from the inner side of the wheel to the outer side of the wheel. The major means for circulating the brake drum cooling air from the inner side of the wheel unit to the outer side thereof will now be described.

Projecting radially inwardly from the inner side of the wheel rim portion 15, adjacent the outer side edge 14 thereof, are a plurality of fan fins or vanes 25. The fan vanes 25 are of substantially constant width throughout their length and are arranged to converge from the rim edge 14 towards the wheel axis or hub portion 11. The inwardly disposed end edges 26 of the fan vanes 25 are spaced axially from the inwardly disposed end edges 27 of the rim supporting fins 21 so as to provide a free space 28 therebetween (see Fig. 1). It is thought to be obvious that on rotation of the wheel unit 10, the spaced fan vanes 25 act as a centrifugal fan unit and discharge air radially outwardly from the air space 28 to the outer side of the wheel rim edge 14. The action of the fan vanes 25 on wheel rotation causes air on the inner side of the wheel unit 10 to be drawn across the brake drum 17 and the drum heat dissipating fins 21 and into the space 28 from whence it is discharged by the vanes 25. Cooling of the brake drum 17 thus naturally results from wheel rotation due to the vanes 25 and as a result improved braking action is obtainable.

In addition to the fan induced movement of the air from the inside to the outside of the wheel unit, there is another force that tends to move the air from the inner side of the wheel to the outer side of the wheel through the spaces 29 between the fins 21 and into the space 28. It is a known fact that there is a pressure differential between the inside and the outside of the wheels of a motor vehicle of current design when the vehicle is in motion. Under such circumstances the pressure on the inside of the wheel is greater than that on the outside of the wheel and as a result air will naturally tend to shift from the inside of the wheel to the outside thereof if sufficient channels or conduits are available to permit this movement. In the case of the wheel unit disclosed, this pressure differential induced movement of the air from the inside of the wheel to the outside thereof through channel spaces 29, 28 assists the fan induced air movement caused by the fins 25 and 21, and thus a maximum air movement is secured across the brake drum 17 and its heat dissipating fins 21.

While the wheel rim 15 carries the fan fins or vanes 25 and provides the shroud portion along the outer side edges of the fan vanes 25, it will be noted that the wheel unit 10 does not provide shroud portions for the inwardly disposed side edges of the fan fins 25. In the invention disclosed the wheel cover 40 includes a substantially axially extending peripheral portion 41 that provides the shroud portion along the inwardly disposed side edges of the fan vanes 25. Thus it will be seen that the wheel unit 10 carries the fan vanes 25 but the wheel cover 40 includes shroud portions 41 that cooperate with the vanes 25 to produce a highly efficient centrifugal fan unit for cooling the brake drum 17.

The wheel cover 40 is preferably formed from an imperforate disc portion 42 that has a separate peripheral flange portion 41 clinched thereto by conventional means 43. The flange portion 41 includes a plurality of circumferentially spaced spring clips 44 that are adapted to engage preformed portions 45 along the inner end edges 26 of the fan vanes 25 to retain the wheel cover in position on the wheel unit 10. The inwardly disposed edge 47 of the wheel cover flange 41 is arranged to extend adjacent the outer side of the wheel web portion 12 near the inner side edges 27 of the fins 21.

With the construction shown in Figs. 1–3, it will be noted that a relatively smooth unobstructed, axially extending path is provided for the free flow of brake drum cooling air from the inside to the outside of the wheel (see arrows Fig. 1). In addition, all fan fins 25 and 21 are carried by the wheel unit 10 and are positioned within the confines of the wheel rim side edges 14, 14' so that there is no danger of the fan fins becoming damaged in the event the wheel should strike a curbing or the like. Furthermore, with the design shown, a wheel cover with an imperforate face portion can be utilized and the fan discharge openings are located adjacent the outside edge 14 of the wheel rim portion 15 where the openings are practically unnoticeable. By having the discharge openings adjacent the tire casing 23 there is some cooling effect on the tire casing as well and this tends to reduce tire wear. It is considered to be of importance that this composite wheel eliminates separate wheel discs, brake drums and wheel cooling fans and thus there is a considerable saving in weight, material, labor and expense.

Figs. 4 and 5 disclose a modified form of the invention wherein the wheel unit 50 has a hub portion 51 connected to a web portion 52 by connectors 53. Web portion 52 has an integrally formed, axially projecting, brake drum flange 54 that includes a liner 55. Brake drum flange 54 supports a plurality of radially extending, circumferentially spaced, heat dissipating fins 56. Fins 56 are connected to and support the wheel rim portion 57. Rim portion 57 is formed adjacent its outer side edge 58 with a plurality of radially extending, inwardly directed, fan vanes 59.

The outer side of the wheel unit 50 is covered with an imperforate wheel cover 60. Wheel cover 60 has a peripheral portion 61 that provides the inner shroud portion for the fan fins 59. Suitable spring clip means (not shown) are utilized to connect the wheel cover 60 to the wheel unit 50.

As was the case with the form of the invention shown in Figs. 1–3, the wheel unit shown in Figs. 4 and 5 also provides an unobstructed, axially extending, path for movement of brake drum cooling air from the inside to the outside of the wheel (see arrows).

Fig. 6 shows another modified form of the invention wherein the brake drum unit 70 is separate from rather than integral with the wheel unit 80. In this form of the invention the wheel unit 80 has a hub portion 81 with a radially extending flange 82 that is adapted to be connected by the bolts 84 to the webs 73 and 83 of the brake drum and wheel units 70 and 80 respectively.

Brake drum web 73 carries an axially extending flange 74 that is lined with a wear resisting liner 76. Brake drum flange 74 mounts a plurality of circumferentially spaced, radially directed fins 75 that serve primarily as drum heat dissipating surfaces but also provide some assistance in moving the brake drum cooling air from the inside to the outside of the wheel. The outer edges of the drum fins 75 extend close to and conform to the shape of the adjacent wheel rim portion 87.

The wheel web portion 83 has an axially extending outer flange 85 that supports a plurality of circumferentially spaced, radially directed, fan vanes 86. Fan vanes 86 are encircled by and connected to the wheel rim portion 87. Fan vanes 86 are connected to and extend radially inwardly from the underside of the rim 87 as was the case in the two preceding forms of the invention.

A wheel cover 90 is detachably connected to the outer side of the wheel unit 80 by means not shown. Wheel cover 90 is preferably of imperforate design and includes a peripheral flange portion 91 that is shaped to conform to the inwardly disposed edges of the fan vanes 86.

As was the case with the two preceding forms of the invention, this form of the invention provides a smooth, unobstructed, axially extending, path for brake drum cooling air to pass from the inside of the wheel to the outside of the wheel during vehicle motion. The Fig. 6 form of the invention is adapted to permit the use of existing finned brake drums with an integrally formed composite wheel unit that includes a forced feed fan depending from the inner side of the rim portion.

I claim:

1. In combination, a wheel unit comprising a hub portion and a connected, radially directed, plate-like, web portion having circumferentially spaced, radially extending fins projecting from the web periphery at one side thereof that support an encircling, axially extending, rim portion, a plurality of axially extending, radially directed fan vanes carried by said rim portion and arranged on the other side of said web in substantial axial alignment with said fins on said one side of said web, and an axially extending, annular, brake drum element formed integrally with and projecting from said one side of said web portion, and a wheel cover enclosing said one side of said web having portions thereof projecting against and encircling the radially inwardly directed side edges of said fan vanes so as to provide a shroud element for said fan vanes, said fins and vanes providing air conduit and air circulating means to force air axially from one side of the wheel through the wheel to the other side thereof during wheel rotation.

2. In combination, a wheel unit comprising a hub portion and a rim portion interconnected by a radially extending web portion, said web portion including on one side thereof an integrally formed, axially extending, annular, brake drum element having radially extending, circumferentially spaced, fin elements extending between the brake drum element and the wheel rim portion, said fin elements being arranged to provide a plurality of axially extending, circumferentially spaced, air passages through the wheel web portion, and a plurality of radially extending, circumferentially spaced, fan vanes projecting from the wheel rim portion on the other side of the web portion and arranged adjacent to and in axial alignment with said air passages to provide a centrifugal force fan to pull air axially through said air passages from one side of the wheel web portion to the other, and a wheel cover enclosing the said other side of the wheel web portion having portions thereof encircling a side edge of said fan vanes and providing a shroud element therefor.

3. A wheel unit comprising axially extending hub and rim portions interconnected by a radially extending web portion, said web portion including an integrally formed, axially extending, annular, brake drum element projecting from one side thereof, a plurality of radially extending, circumferentially spaced, integrally formed, fin elements extending between the outer periphery of the brake drum element and the inner periphery of the wheel rim portion, said fin elements being arranged to provide a plurality of substantially axially extending, circumferentially spaced, air passages through the wheel web portion, and a plurality of radially extending, circumferentially spaced, fan vanes projecting from the inner periphery of the wheel rim portion on the other side of the web portion, said fan vanes being arranged axially adjacent said air passages and having portions extending radially outwardly therefrom to provide a centrifugal fan unit to pull air axially through said air passages from said one side of the wheel web portion to said other side thereof during wheel rotation.

4. A wheel unit comprising axially extending hub and rim portions interconnected by a radially extending web portion, said web portion including an integrally formed, axially extending, annular, brake drum element projecting from one side thereof, a plurality of radially extending, circumferentially spaced, integrally formed, fin elements extending between the outer periphery of the brake drum element and the inner periphery of the wheel rim portion, said fin elements being arranged to provide a plurality of substantially axially extending, circumferentially spaced, air passages through the wheel web portion, and a plurality of radially extending, circumferentially spaced, fan vanes projecting from the inner periphery of the wheel rim portion on the other side of the web portion, said fan vanes being arranged axially adjacent to but axially spaced from said fins and said air passages and having portions extending radially outwardly therefrom to provide a centrifugal fan unit to pull air axially through said air passages from said one side of the wheel web portion to said other side thereof during wheel rotation.

5. A wheel unit comprising axially extending hub and rim portions interconnected by a radially extending web portion, said web portion including an integrally formed, axially extending, annular, brake drum element projecting from one side thereof, a plurality of radially extending, circumferentially spaced, integrally formed, fin elements extending between the outer periphery of the brake drum element and the inner periphery of the wheel rim portion, said fin elements being arranged to provide a plurality of substantially axially extending, circumferentially spaced, air passages through the wheel web portion, and a plurality of radially extending, circumferentially spaced, fan vanes projecting from the inner periphery of the wheel rim portion on the other side of the web portion, said fan vanes being arranged axially adjacent to but circumferentially spaced from said fins while aligned with said air passages and having portions extending radially outwardly from the fins to provide a centrifugal fan unit to pull air axially through said air passages from said one side of the wheel web portion to said other side thereof during wheel rotation.

6. In combination, a wheel unit comprising axially extending hub and rim portions interconnected by a radially extending web portion, said web portion including an integrally formed, axially extending, annular, brake drum element projecting from one side thereof, a plurality of radially extending, circumferentially spaced, integrally formed, fin elements extending between the outer periphery of the brake drum element and the inner periphery of the wheel rim portion, said fin elements being arranged to provide a plurality of substantially axially extending, circumferentially spaced, air passages through the wheel web portion, and a plurality of radially extending, circumferentially spaced, fan vanes projecting from the inner periphery of the wheel rim portion on the other side of the web portion, said fan vanes being arranged axially adjacent to but circumferentially spaced from said fins while aligned with said air passages to provide a centrifugal fan unit to pull air axially through said air passages from said one side of the wheel web portion to said other side thereof during wheel rotation, and a wheel cover enclosing the said other side of the wheel web portion and having portions engaging the side edges of said fan vanes to provide a shroud element for said fan vanes.

References Cited in the file of this patent

UNITED STATES PATENTS

| | | |
|---|---|---|
| 1,159,502 | King et al. | Nov. 9, 1915 |
| 1,906,737 | Burgess | May 2, 1933 |
| 1,957,654 | LaBrie | May 8, 1934 |
| 2,053,735 | Overholser | Sept. 8, 1936 |
| 2,143,950 | Kliesrath | Jan. 17, 1939 |
| 2,175,044 | Van Halteren | Oct. 3, 1939 |
| 2,179,656 | Eksergian | Nov. 14, 1939 |
| 2,248,684 | Levy | July 8, 1941 |
| 2,274,503 | Reid | Feb. 24, 1942 |
| 2,414,156 | Malthaner | Jan. 14, 1947 |
| 2,441,008 | Chase | May 4, 1948 |

FOREIGN PATENTS

| | | |
|---|---|---|
| 637,892 | Germany | Nov. 19, 1935 |
| 707,113 | Germany | May 8, 1941 |
| 229,889 | Great Britain | Mar. 5, 1925 |
| 434,610 | Great Britain | Sept. 5, 1935 |